United States Patent
Gupta et al.

(10) Patent No.: US 8,392,113 B2
(45) Date of Patent: Mar. 5, 2013

(54) METHOD AND APPARATUS FOR ACCOUNTING FOR USER EXPERIENCE IN PEDESTRIAN NAVIGATION ROUTING

(75) Inventors: Rajarshi Gupta, Santa Clara, CA (US); Saumitra Mohan Das, San Jose, CA (US); Min-Wook Jeong, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/846,672

(22) Filed: Jul. 29, 2010

(65) Prior Publication Data

US 2011/0144903 A1    Jun. 16, 2011

Related U.S. Application Data

(60) Provisional application No. 61/285,852, filed on Dec. 11, 2009.

(51) Int. Cl.
  *G01C 21/00* (2006.01)
  *G01C 21/34* (2006.01)
  *G08G 1/123* (2006.01)

(52) U.S. Cl. ........ 701/426; 701/425; 701/433; 701/434; 701/438; 701/400; 701/409; 701/410; 701/526; 701/533; 701/541

(58) Field of Classification Search ............. 701/433, 701/426, 438, 434, 400, 409, 410, 526, 533, 701/541, 425
See application file for complete search history.

(56) References Cited

U.S. PATENT DOCUMENTS

| | | | |
|---|---|---|---|
| 5,470,233 A * | 11/1995 | Fruchterman et al. | 434/112 |
| 6,041,311 A | 3/2000 | Chislenko et al. | |
| 6,542,811 B2 | 4/2003 | Doi | |
| 6,845,321 B1 * | 1/2005 | Kerns | 701/426 |
| 6,922,633 B2 | 7/2005 | Takenaka | |
| 2002/0016670 A1 | 2/2002 | Powell et al. | |
| 2002/0065604 A1 * | 5/2002 | Sekiyama | 701/209 |
| 2007/0219706 A1 | 9/2007 | Sheynblat | |
| 2008/0154720 A1 * | 6/2008 | Gounares et al. | 705/14 |
| 2008/0281516 A1 * | 11/2008 | Cummings | 701/210 |

(Continued)

FOREIGN PATENT DOCUMENTS

| | | |
|---|---|---|
| EP | 1241651 A1 | 9/2002 |
| JP | 2004197653 A | 1/2006 |
| JP | 2005196476 A | 1/2007 |
| JP | 2007078367 A | 3/2007 |

OTHER PUBLICATIONS

Seth Rogers and Pat Langley, "Personalized Driving Route Recommendations", 1998, AAAI Technical Report WS-98-08, available at https://www.aaai.org/Papers/Workshops/1998/WS-98-08/WS98-08-025.pdf.*

(Continued)

*Primary Examiner* — Ryan Zeender
*Assistant Examiner* — Allen Chein
(74) *Attorney, Agent, or Firm* — Jimmy Cheng; Arnold J. Gum

(57) ABSTRACT

The subject matter disclosed herein relates to a system and method for determining navigation instructions within a pedestrian navigation environment. For example, a system and method are provided for determining an optimal path to a destination. An optimal path may be determined based at least in part on a measurement of similarity between one or more points of interest and one or more destinations. Such a measurement of similarity may be based at least in part on predefined criteria between the one or more destinations and one or more points of interest.

44 Claims, 6 Drawing Sheets

U.S. PATENT DOCUMENTS

2009/0234574 A1 9/2009 Deng et al.
2011/0320275 A1* 12/2011 O'Sullivan et al. ........ 705/14.53

OTHER PUBLICATIONS

Proceedings 2008 International Conference or Computational Intelligence for Modelling, Control and Automation, CIMCA, Dec. 10-12, 2008 Vienna, Austria, Edited by Masoud Mohammadian, p. 308-813.
On the M-CubITS Pedestrian Navigation System, Proceedings of the IEEE ITSC Sep. 17-20, 2006, Toronto, Canada, p. 793-798.
International Search Report and Written Opinion—PCT/US2010/059574, International Search Authority—European Patent Office—Mar. 22, 2011.

* cited by examiner

METHOD AND APPARATUS FOR ACCOUNTING FOR USER EXPERIENCE IN PEDESTRIAN NAVIGATION ROUTING

CLAIM OF PRIORITY UNDER 35 U.S.C. §119

This application claims priority to provisional patent application Ser. No. 61/285,852, entitled "User Experience Aware Routing", filed on Dec. 11, 2009, assigned to the assignee hereof, and expressly incorporated by reference herein.

BACKGROUND

1. Field

The subject matter disclosed herein relates to pedestrian navigation routing based at least in part on user experience information.

2. Information

Navigation systems are becoming more and more pervasive in today's market. A navigation system may be utilized to determine a route from a first location to a destination. In some navigation systems, a user may enter a start location and a destination into a mapping application, such as one of the different mapping applications commonly used on websites such as Mapquest.com.

A pedestrian may travel to a destination within an enclosed environment, such as a shopping mall or office building, for example. A pedestrian may sometimes avoid travelling along a shortest path and may instead choose to follow a detour in order to view a coin fountain or to enjoy a more scenic view, for example. A navigation system which fails to account for possible relevant points of interest in routing a user to a destination may not accurately model a user experience of a typical user travelling to the destination.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
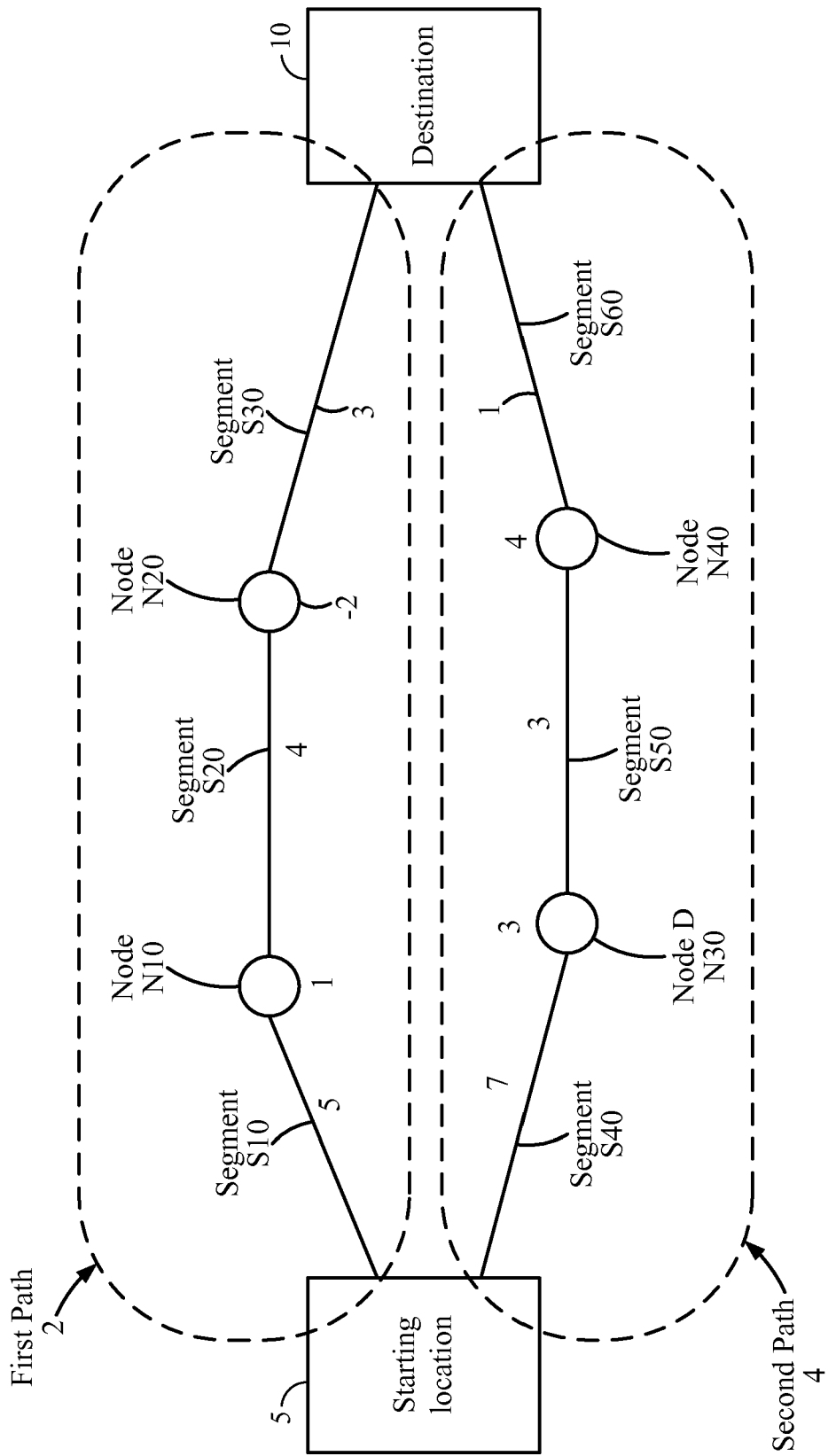
FIG. 1 is a view of two paths to a destination according to one or more implementations.

In one particular implementation, a system and method are provided for determining an optimal path to a destination. An optimal path may be determined based at least in part on a measurement of similarity between one or more points of interest and one or more destinations. Such a measurement of similarity may be based at least in part on predefined criteria between the one or more destinations and one or more points of interest. It should be understood, however, that this is merely an example implementation, and that claimed subject matter is not limited in this respect.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Some navigation systems utilize electronic maps to guide a user from a start location to a destination. For example, electronic maps may be presented on a display screen of a mobile device, for example. Such electronic maps may be stored in a memory of a mobile device in some implementations or may be transmitted to the mobile device from a map server, for example. Navigation systems may be utilized within an indoor pedestrian environment, such as a shopping mall, to guide a user to a destination such as a department store or a food court, for example. In some implementations, a user may be provided with navigation instructions informing the user to walk in a particular direction for a certain distance or until a landmark has been reached, such as a bench or hallway, and then change direction. For example, upon reaching a bench, a user may be instructed to turn left and continue walking. Such navigation instructions may be presented on a display screen of a mobile device, for example. In some implementations, navigation instructions may be audibly presented to a user via a speaker and/or headphones, for example. Navigation instructions to guide a user from a starting location to a destination may include several segments or branches, for example. For example, a navigation instruction to "walk straight for 50 feet" may comprise a first branch and "turn left and walk straight for 60 feet" may comprise a second branch. In an indoor environment, there may be numerous branches along a particular path from a starting location to an end location or destination.

In some navigation systems, a user may carry a mobile device, such as a cell phone, Personal Digital Assistant (PDA), or any other portable electronic device capable of receiving a user input and/or presenting navigation instructions. In some implementations, a mobile device may determine its own location, for example. In one particular implementation, a mobile device may estimate its location based on navigation signals received from a Satellite Positioning System (SPS), such as GPS or Galileo by, for example, correlating pseudorange measurements from several (e.g., four or more) transmitters.

However, a mobile device may be utilized within an area where navigation signals from a Satellite Positioning System (SPS) are not available, such as, for example, within certain structures such as buildings. In one implementation, a mobile device may estimate its location based on signals wirelessly received from wireless network elements or other devices capable of wirelessly transmitting signals. Wireless network elements, such as wireless local area network (WLAN) access points and/or femtocells, may be located throughout such an area at known locations and a mobile device may estimate ranges from the mobile device to particular wireless network elements (e.g., by measuring received signal strength or round-trip delay). Such ranges may be estimated, and a location of such a mobile device may be triangulated using known techniques.

In one implementation, a mobile device may estimate its own location by communicating with one or more nearby femtocells. A "femtocell," as used herein, may refer to a small cellular base station. Such a femtocell may connect to a service provider's network via broadband (such as, for example, via Digital Subscriber Line (DSL) or cable).

In one or more implementations, a user may, for example, utilize a key pad of a mobile device to submit an identity one or more destinations to which navigation instructions are desired. For example, a user may type in the name of a particular store or the name of a category, such as "shoe store." In some implementations, various categories of destinations may be presented via a display screen and a user may select a particular category via a user input device, such as a stylus, touch screen, keypad, or keyboard, to name just a few examples of user input devices.

If a user's location estimate and at least one intended destination are both known, a route may be determined to guide a user to a destination. In some implementations, a navigation application may be executed on a mobile device to determine a route. In other implementations, however, a network element, such as a server, may determine a route and navigation instructions to guide a user to a destination. Upon determining such navigation instructions, a server may, for example, transmit or initiate transmission of such navigation instructions to a mobile device of a user.

According to one or more implementations, a person may utilize a navigation system to receive navigation instructions/directions to guide such a person from a starting location to a destination within a pedestrian navigation environment. A "pedestrian navigation environment," as used herein may refer to a pedestrian-accessible environment or area. For example, an area where a pedestrian may walk, run, ride in a wheelchair, bike, or otherwise physically move from one location to another may comprise a pedestrian navigation environment. Examples of pedestrian navigation environments include indoor environments and outdoor environments. Examples of indoor pedestrian environments include enclosed structures such as office buildings, hotels, shopping malls, convention centers, and sports stadiums, to name just a few among many possible examples. Examples of outdoor pedestrian environments include amusement parks, zoos, outdoor shopping strips or malls, parks, and areas having pedestrian-accessible walkways, such as sidewalks, to name just a few among many possible examples.

A person may be guided along one or more nodes along a path. Various points of interest may be located along a path or within a certain proximity of the path. A point of interest may comprise a node. A "point of interest," as used herein, may refer to a location within a certain area which may be of interest to a person, such as a user of a mobile device. Examples of points of interest include office rooms, bathrooms, meeting rooms, cafeterias, and stores, to name just a few among many different examples.

In one or more implementations, an optimal path may be determined to guide an individual from a starting location to one or more destinations. In one or more implementations, an optimal path may comprise a "lowest cost" path. For example, a cost may be determined for individual segments between nodes along a path or such nodes themselves and navigation instructions for a path having a lowest cost may be presented to a user. A version of Dijkstra's algorithm may be utilized to determine a total cost for a particular path. A route may be presented to a user that comprises a lowest cost path.

A "cost," as used herein, may refer to a value assigned to one or more segments and/or nodes along a path that are indicative of certain predefined criteria, such as simplicity of navigation, for example. In one or more implementations, a total cost may be calculated for a path by summing values of nodes and segments located along the path. It should be understood, however, that these are merely examples of determining a cost associated with a path in a particular implementation and that claimed subject matter is not limited in this respect.

In one or more implementations, a cost may be associated with or assigned to one or more segments or portions of a path. In one implementation, a cost for a particular segment may be determined based at least in part on certain criteria such as, for example, a length of the segment, whether an environment associated with the segment has sufficient lighting for a pedestrian to walk safely, is known to be crowded, or whether the segment includes a portion accessible by an escalator, to name just a few among many possible examples.

A path may be associated with a distance cost based at least in part on a physical distance between a starting location and one or more destinations. To determine an overall cost for a path, a distance cost for the path may be summed with costs for points of interest and/or segments located along the path. A distance cost for a path may be represented with a positive value or number. A point of interest may be represented with a value or number that is positive or negative. A positive value of a cost for a point of interest may indicate that the point of interest adds to an overall cost for a path. A negative value of a cost for a point of interest, on the other hand, may indicate that the point of interest adds value and therefore reduces an overall cost for the path.

A lowest cost path may comprise either a path associated with a largest negative value or a lowest positive value if there are no paths associated with negative values. For example, a path associated with a cost of −10.0 may therefore be associated with a lower cost than a path associated with a cost of −5.5. Similarly, a path associated with a cost of −5.0 may therefore be associated with a lower cost than a path associated with a cost of +4.5. Likewise, a path associated with a cost of +4.5 may be associated with a lower cost than a path associated with a cost of +10.5.

As discussed above, a path may include several nodes and segments disposed between the nodes. In some implementations, individual segments may have dynamic values. For example, a value representative of a level of crowdedness may be at least partially dependent upon a particular time of day. For example, a restaurant may be more crowded at noon than it is at 3:00 P.M. and such a crowdedness value may therefore be associated with a lesser value at 3:00 P.M. than it would be at noon.

Nodes for a particular path may be associated with costs that are dependent upon a particular destination. In one or more implementations, points of interest that are similar to a destination, based on a predefined set of criteria, may be associated with a relatively low cost, whereas points of interest that are relatively dissimilar to a destination may be associated with a relatively high cost. In some implementations, a particular point of interest may be so closely related to a destination that routing a person along a portion of a path associated with the point of interest adds value to the path. In other words, instead of representing a cost that subtracts from an overall value of a path, some points of interest are so closely related to a destination that such points of interest add to an overall value of a path. Such points of interest that add value to a path may be associated with negative values as discussed above because such points of interest effectively add value to a path and therefore reduce an overall cost for the path. As discussed above, an overall cost for a particular path may be determined by adding individual costs of various points of interest and/or segments along the path with a distance cost for the path. Two paths associated with the same distance cost may nevertheless be associated with different total costs as a result of influence of various points of interest located along each path.

FIG. 1 is a view of two paths to a destination according to one or more implementations. For example, first path 2 and second path 4 illustrate different paths to travel from a starting location 5 to a destination 10. First path 2 includes segment S10, node N10, segment S20, node N20, and segment S30. Second path includes segment S40, node N30, segment S50, node N40, and segment S60. Segments and nodes shown in FIG. 1 are associated with costs. For example, segment S10 is associated with a cost equal to "5," node N10 is associated with a cost equal to "1," segment S20 is associated with a cost equal to "4," node N20 is associated with a cost equal to "−2," and segment S30 is associated with a cost equal to "3." By summing costs associated with segments and nodes within first path 2, an overall cost of the first path may be calculated to have a value equal to "11."

Second path 4 includes segment S40 having a cost equal to "7," node N30 having a cost equal to "3," segment S50 having a cost equal to "3," node N40 having a cost equal to "4," and segment S60 having a cost equal to "1." By summing costs associated with segments and nodes within second path 4, an overall cost of the second path 4 may be calculated to have a value equal to "18." Accordingly, because first path 2 is associated with an overall lower cost than second path 4, first path 2 is a lowest cost path in this example and navigation instructions may be determined and presented to guide a user from starting location 5 to destination 10 along first path 2.

In one or more implementations, a location, such as a point of interest, may be associated with a properties vector. A "properties vector," as used herein may refer to a vector of values characterizing a point of interest. There may be one or more points of interest located along a route to one or more destinations. One or more properties vectors may be associated with one or more points of interest. Similarly, one or more properties vectors may be associated with one or more destinations. In one or more implementations, a particular point of interest is associated with one particular properties vector, and a particular destination is associated with one particular properties vector. For the sake of clarity, a properties vector for a point of interest may be referred to herein as a "point of interest properties vector," and a properties vector for a destination may be referred to herein as a "destination properties vector." However, it should be appreciated that a properties vector for a particular location may be associated with the same categories and values regardless of whether the particular location is a point of interest or a destination along a particular route.

A properties vector may include one or more predefined criteria such as categories and associated weights or values. For example, a restaurant may be associated with predefined criteria such as categories including "food served," "alcohol served," "child-friendly," "crowded," and "smoking," to name just a few among many possible categories. A value may be associated with each category. For example, a value for a category may fall within a predefined range, such as between −1.0 and +1.0. A positive value may indicate, for example, that an item in an associated category is present within a point of interest to the extent that it adds to an overall user experience. Accordingly, a value of +1.0 for a "food served" category may indicate that a wide variety of food is available at an associated point on interest. On the other hand, a lesser positive value, such as +0.25, may indicate that an item in an associated category adds to a user experience to a lesser extent. A negative value for a category may indicate that an item associated with the category is present at a point of interest to the extent that it detracts from an overall user experience. For example, a bar which has been cited for health code violations may be associated with a negative value of an item for a category such as "cleanliness," for example. Properties vectors are discussed further below with respect to Tables A, B, and C.

In some implementations, a point of interest properties vector for a first point of interest may include different categories from a point of interest properties vector for a second point of interest. For example, a shoe store may include a category such as "running shoes," whereas a point of interest properties vector for a restaurant might not include the same category.

If a destination is known, a destination properties vector for the destination may be compared against various point of interest properties vectors to measure how similar a particular point of interest is to a destination. A cost for a point of interest may be determined based at least in part on a measurement of similarity between the point of interest and a destination. A "measurement of similarity" or "predefined measurement of similarity," as used herein may refer to a measurement indicative of how closely a point of interest resembles a destination based at least in part on one or more characteristics or factors. For example, characteristics in a point of interest properties vector may be compared with corresponding characteristics in a destination properties vector to determine a measurement of similarity between an associated point of interest and an associated destination.

In one or more implementations, a measurement of similarity between a point of interest and a destination may be determined based at least in part on predefined criteria such as, for example, by calculating a dot product between a point of interest properties vector and a destination properties vector in one or more implementations. To compute a dot product, values for each category in a destination properties vector may be multiplied with values in the same categories in a corresponding point of interest properties vector. If, for example, both a point of interest and a destination include the category "crowded," and a point of interest properties vector has a value of 0.4 and a destination properties vector has a value of 0.6, the product of these values would be 0.24. Similar products may be determined by multiplying values for other common categories. For example, if only one of the properties vectors being multiplied includes a particular category, then the product for such a category is 0. After products across all categories have been computed, the products may be summed to determine a value. In one or more implementations, a relatively large value may indicate a high level or similarity between a point of interest and a destination. Accordingly, as a result of such a high level of similarity, a cost associated with such a point of interest may be relatively low. A lookup table may be utilized to determine a cost based on an associated measurement of similarity determined based on a dot product, for example. In some implementations, on the other hand, a value of a dot product between a point of interest properties vector and a destination properties vector may itself be utilized directly as a cost for the point of interest without reference to a lookup table.

It should be appreciated that different destinations may be associated with different destination properties vectors having different categories and/or different associated values for categories. An overall cost for a point of interest may therefore be dependent upon the particular destination at issue.

Figure 2:
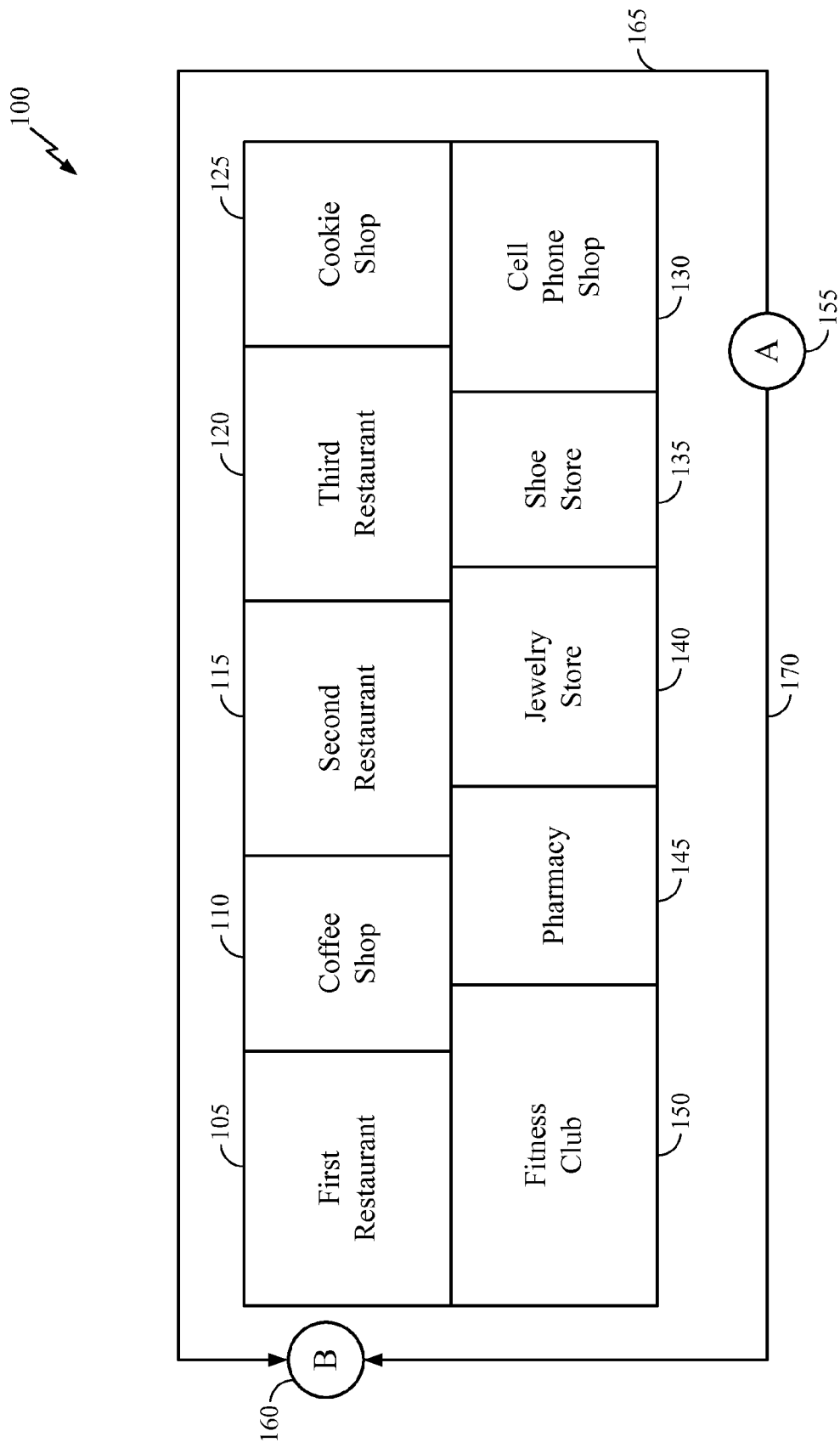
FIG. 2 illustrates a view of a shopping mall according to one or more implementations.

FIG. 2 illustrates a view of a shopping mall 100 according to one or more implementations. Shopping mall 100 may include several stores/places of business within a structure or building. In this example, shopping mall 100 may comprise an area where a user may travel around a perimeter to gain access to an entrance to a particular store/place of business, for example. As shown, shopping mall 100 houses a first restaurant 105, coffee shop 110, second restaurant 115, third restaurant 120, cookie shop 125, cell phone shop 130, shoe store 135, jewelry store 140, pharmacy 145, and fitness club 150.

A user may desire to travel from point A 155 to point B 160. If the user is unfamiliar with shopping mall 100 and does not know a location of first restaurant 105, the user may provide an input to a mobile device having a navigation application program to indicate a desire for directions to first restaurant 105 located near point B 160. As shown in FIG. 2, there are two different paths along which a user may travel from point A 155 to point B 160. A first path 170 comprises a shorter distance than a second path 165. A user may request directions to point B 160 if the user is not aware of any other restaurants located in shopping mall 100. In such a case, a typical user might prefer to travel past other restaurants or food shops to see what other types of restaurants are available. For example, a user might desire to travel past a number of restaurants in case first restaurant 105 is very crowded so that the user may be made aware of less crowded alternatives.

In this example, although second path 165 is shown as being longer than first path 170, second path 165 routes a user past several restaurants or food shops, such as cookie shop 125, third restaurant 120, second restaurant 115, and coffee shop 110 on the way to point B 160 located near first restaurant 105. In this example, second path 165 may be a more desirable path than first path 170 because second path 165 directs a user past numerous points of interest that have some similarities with a destination, which in this case is first restaurant 105. In this example, each of cookie shop 125, third restaurant 120, second restaurant 115, and coffee shop 110 may sell food items and/or beverages that may be consumed and may therefore be of interest to a user.

There may be several nodes located along a path. There may be different types of nodes considered by a navigation system, such as point of interest nodes and corridor nodes. A point of interest node may comprise a particular node associated with a point of interest. For example, if a pharmacy comprises a point of interest, a point of interest node may represent the pharmacy in a navigation application. A point of interest node may be associated with a cost representative of such a pharmacy.

A corridor node may comprise a node location within a corridor. In one example, corridor nodes may be regularly or approximately evenly spaced out throughout a corridor and a corridor node may be associated with a cost. In one or more implementations, a cost for a particular corridor node may be at least partly dependent upon whether a point of interest node is within a close proximity of the corridor node.

In one or more implementations, a point of interest node may be located off of a corridor. For example, a point of interest may be located adjacent to or accessible by a corridor, instead of actually being located within the corridor itself. Accordingly, in order to account for a cost associated with a point of interest node, a cost for the point of interest node may be projected onto or applied to one or more corridor nodes, as discussed below.

Figure 3:
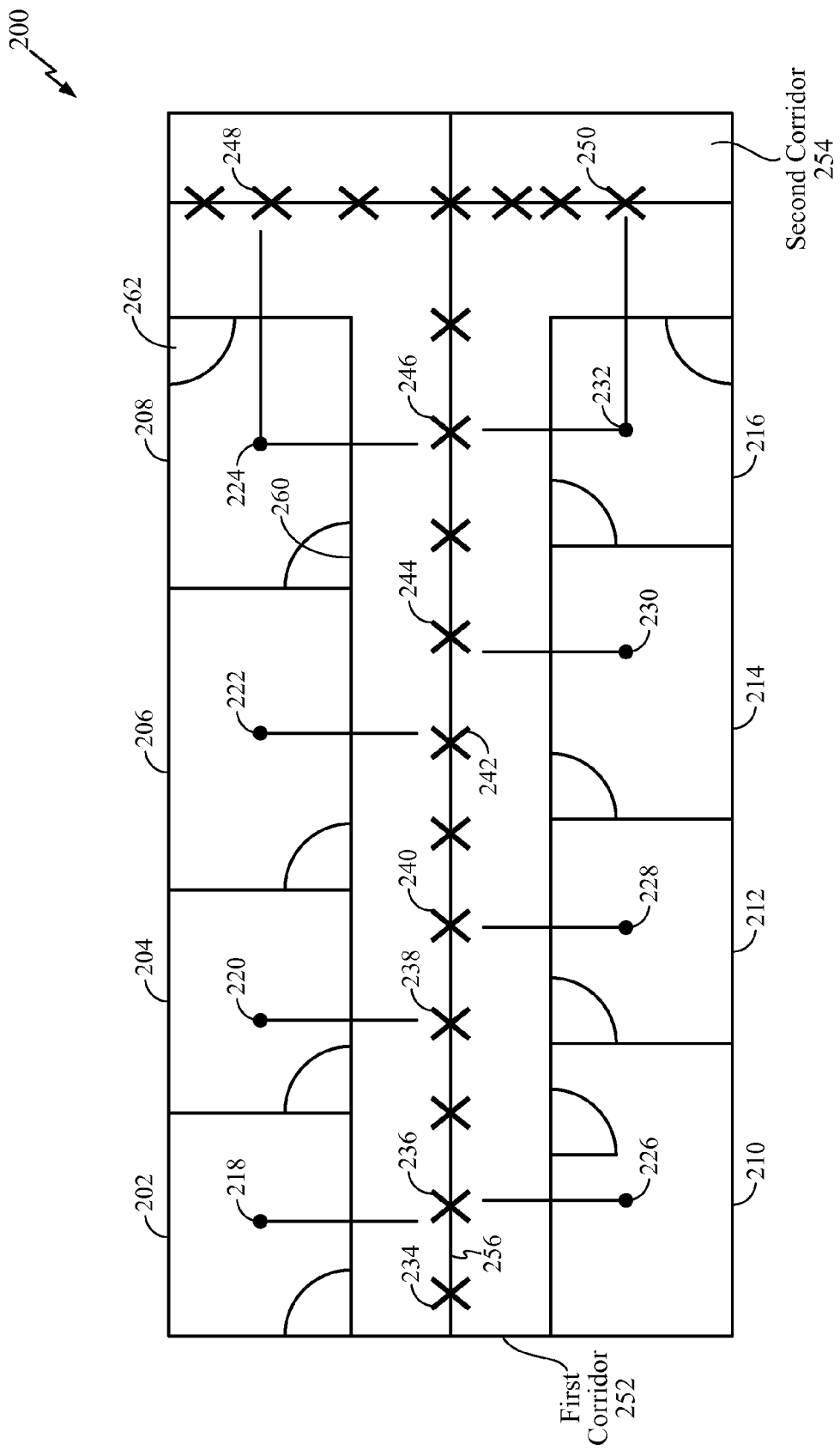
FIG. 3 illustrates a view of an electronic map according to one or more implementations.

FIG. 3 illustrates a view of an electronic map 200 according to one or more implementations. Electronic map 200 may depict an area of an office building, for example. Electronic map 200 may illustrate several points of interest, such as first point of interest 202, second point of interest 204, third point of interest 206, fourth point of interest 208, fifth point of interest 210, sixth point of interest 212, seventh point of interest 214, and eighth point of interest 216. Each point of interest may include or be co-located with one or more point of interest nodes. For example, first point of interest 202 may include first point of interest node 218, second point of interest 204 may include second point of interest node 220, third point of interest 206 may include third point of interest node 222, fourth point of interest 208 may include fourth point of interest node 224, fifth point of interest 210 may include fifth point of interest node 226, sixth point of interest 212 may include sixth point of interest node 228, seventh point of interest 214 may include seventh point of interest node 230, and eighth point of interest 216 may include eighth point of interest node 232.

Electronic map 200 illustrates two corridors—a first corridor 252 and a second corridor 254. Several corridor nodes 234 may be dispersed throughout first corridor 252 and second corridor 254. Corridor nodes are represented in electronic map 200 with "x" characters. A segment may be located between corridor nodes. For example, segment 256 is located between corridor nodes 234 and 236. Corridor nodes 234 and segments 256 may each be associated with a cost. Such costs may be considered by a navigation system determining a lowest cost path from a starting location to a destination. A cost associated with a point of interest node may be projected onto a nearby corridor node. For example, a cost for a point of interest node may be projected onto a corridor node located closest to the point of interest node. For example, costs for first point of interest node 218 and fifth point of interest node 226 may be projected onto corridor node 236. Similarly, a cost for second point of interest node 220 may be projected onto corridor node 238, a cost for third point of interest node 222 may be projected onto corridor node 242, cost for sixth point of interest node 228 may be projected onto corridor node 240, and a cost for seventh point of interest node 230 may be projected onto corridor node 244.

Some points of interest may be located near an intersection of two corridors. In this example, fourth point of interest 208 and eighth point of interest 216 border both first corridor 252 and second corridor 254. In one or more examples, a cost for a point of interest node may be projected onto corridor nodes located in more than one corridor if a point of interest associated with the point of interest node contains multiple entryways or doors. For example, fourth point of interest 208 may include a first entryway 260 that provides access to first corridor 252 and a second entryway 262 that provides access to second corridor 254. A cost for fourth point of interest node 224 may be projected onto corridor node 246 located within first corridor 252 and corridor node 248 located within second corridor 254. Similarly, a cost for eighth point of interest node 232 may be projected onto corridor node 246 located within first corridor 252 and corridor node 250 located within second corridor 254.

A lowest cost path may be determined to guide a user from a starting location to a destination. Such a lowest cost path may extend through one or more corridors and across multiple corridor nodes and segments. It should be appreciated that costs associated with points of interest may have an impact on a lowest cost path because such costs are projected onto one or more corridor nodes.

Figure 4A:
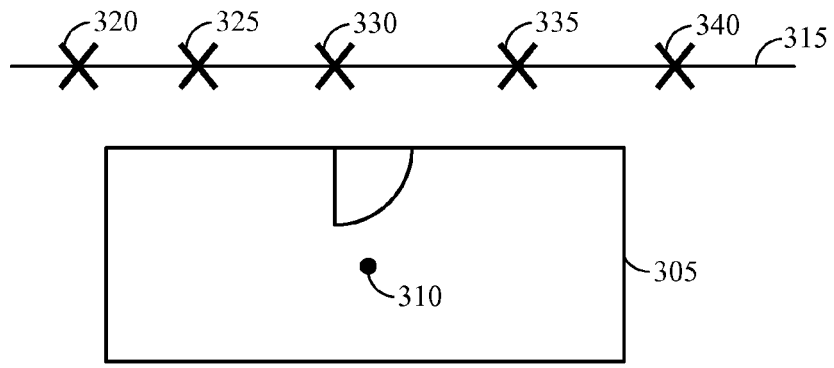
FIGS. 4A-C illustrate views of a portion of an electronic map in which a cost associated with a point of interest node is projected onto one or more corridor nodes according to one or more implementations.
Figure 4B:
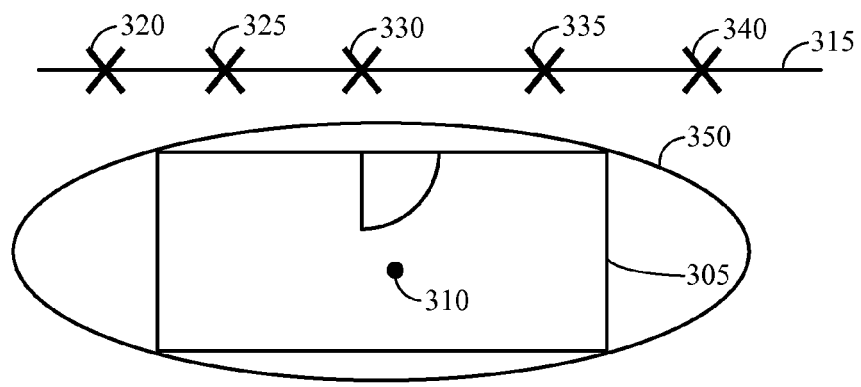
Figure 4C:
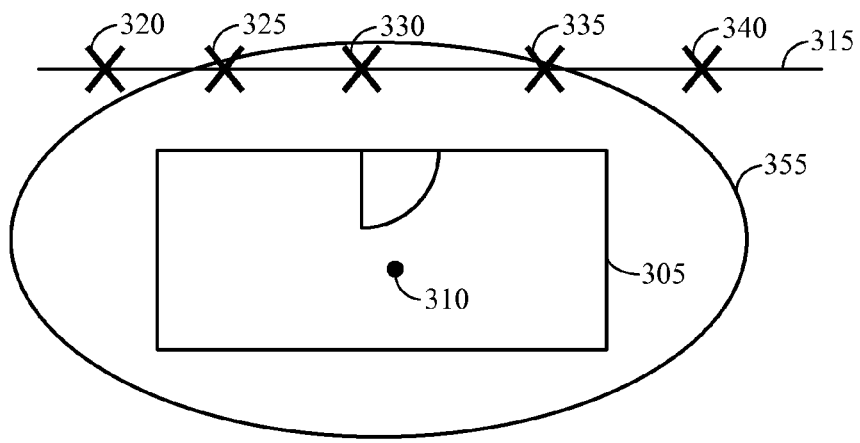

There are other ways with which to project costs associated with point of interest nodes onto one or more corridor nodes. FIGS. 4A-C illustrate views of a portion of an electronic map in which a cost associated with a point of interest node is projected onto one or more corridor nodes. FIG. 4A illustrates a point of interest 305 associated with a point of interest node 310. A corridor 315 is located along one side of point of interest 305. Corridor nodes 320, 325, 330, 335, and 340 may be located within corridor 315. Instead of projecting a cost for point of interest node 310 onto one corridor node located along corridor 315, as was performed with respect to FIG. 3 as discussed above, the cost may instead be projected onto multiple corridor nodes based at least in part on proximity between such corridor nodes and point of interest 305.

FIG. 4B illustrates an ellipse 350 drawn around point of interest 305. As shown, ellipse 350 may completely surround point of interest 305. In one example, foci of ellipse 350 may be selected to generate the smallest possible ellipse 350 capable of completely surrounding point of interest 305. Ellipse 350 may be increased by a predefined amount or percentage to generate a larger ellipse capable of overlapping with one or more corridor nodes.

FIG. 4C illustrates an enlarged ellipse 355 that may be generated by increasing ellipse 350 by a certain amount, such as, for example, 50%. As shown, enlarged ellipse encompasses corridor nodes 325, 330, and 335. In one implementation, a cost for point of interest node 310 may be projected onto any corridor nodes located within enlarged ellipse 355. In this example, a cost for point of interest node 310 may therefore be projected onto corridor nodes 325, 330, and 335.

Accordingly, the electronic maps shown in FIGS. 4A-C may be utilized to project costs for point of interest nodes onto one or more corridor nodes. It should be appreciated that a size of enlarged ellipse 355 may be dependent on size/dimensions of a particular point of interest around which it is disposed. For example, although three corridor nodes 325, 330, and 335 fall within the scope of enlarged ellipse 355 shown in FIG. 4C, an enlarged ellipse for a room with smaller dimensions might encompass only one or two corridor nodes.

The electronic maps shown in FIGS. 4A-C may be utilized to account for a user experience when a user travels past a large point of interest, such as a department store, for example. If, for example, a department store has a large amount of window space and various outfits are shown in a window, a user might be more likely to stop and window shop if the window space is large. Accordingly, a cost associated with such a point of interest may be projected onto multiple corridor nodes to effectively multiply a cost of a point of interest based at least in part on its dimensions/physical size. If a point of interest is so similar with a destination that it is associated with a negative cost, for example, an ellipse method as discussed above may project a negative cost for point of interest onto multiple corridor nodes to effectively guide a user past such a point of interest along a lowest cost path.

A cost for a particular point of interest may be based at least in part on a measurement of similarity between the point of interest and a destination, for example. Points of interest may be associated with one or more point of interest properties vectors, as discussed above. Similarly, a destination may be associated with a destination properties vector. Each properties vector may include one or more categories and associated values for each category to categorize a point of interest or destination. A measurement of similarity between a point of interest and a destination may be determined based at least in part on computation of a dot product between a point of interest properties vector and a destination properties vector. A properties vector for a point of interest may contain similar weightings for the same categories as a destination properties vector for a similar destination. A dot product determined between such a destination properties vector and a point of interest properties vector may be associated with a higher value than would a dot product determined between a destination properties vector and a point of interest properties vector for a point of interest that is unrelated to a destination. Accordingly, a value of a dot product between a destination properties vector and a point of interest properties vector may indicate an estimate of similarity between an associated destination and an associated point of interest.

Table A shown below illustrates a destination properties vector for a restaurant. In one or more implementations, a properties vector is associated with one or more points of interest. As discussed above, if a particular point of interest is a destination for a user, a properties vector associated with the destination is referred to as a destination properties vector. On the other hand, if a user desires directions to a different point of interest, a properties vector for the point of interest is instead referred to as a point of interest properties vector. In either case, the same properties vector and associated categories and values may be associated with a particular location regardless of whether that particular location comprises a point of interest or a destination.

Table A illustrates several categories and associated values for a restaurant. In this example, categories include "nourishment," "crowdedness," "child-friendly," "noise level," and "vegan food." A value for "nourishment" is listed at 1.00. For example, because a restaurant may offer a wide variety of food and beverages, category "nourishment" may be associated with a high value, which in this case is 1.00. "Crowdedness" is listed as having a value of −0.60. If, for example, a restaurant is typically so packed with people that the crowdedness detracts from an overall user experience, a negative value may be associated with a "crowdedness" category. A third category in this example is "child-friendly," which is associated with a value of 0.75. If, for example, a restaurant has a children's menu and/or placements that children can color with crayons, a relatively high value may be associated with "child-friendly." "Noise level" is associated with a value of −0.50. If, for example, a restaurant is very loud, a category for "noise level" may be associated with a negative value. Finally, category "vegan food" may be associated with a value of 0.80. If a restaurant offers several vegetarian entrees, category "vegan food" may be associated with a relatively high value, such as 0.80 in this example. It should be appreciated that although only five categories are shown in Table A, in practice additional and/or alternative categories may be included within a destination properties vector.

TABLE A

| destination properties vector for a restaurant | |
|---|---|
| Categories | Value |
| Nourishment | 1.00 |
| Crowdedness | −0.60 |
| Child-friendly | 0.75 |
| Noise level | −0.50 |
| Vegan food | 0.80 |

Table B illustrates a point of interest properties vector for a bar that comprises a point of interest. As shown, Table B includes various categories such as "nourishment," "crowdedness," "child-friendly," "noise level," and "alcohol selection." "Nourishment" is associated with a value of 0.60 to indicate that a source of nourishment is available at the associated point of interest. For example, a bar may offer peanuts, refreshments, and/or simple meals such as hamburgers, although a selection of food is not as large as would be available at a full scale restaurant. "Crowdedness" may be associated with a value of −0.80 to indicate that the bar is crowded to the extent that it detracts from an overall user experience. "Child-friendly" may be associated with a value of −1.0 to indicate, for example, that children are banned from the establishment. "Noise level" may also be associated with a value of −1.0 to indicate, for example, that the bar is very loud to the extent that it greatly detracts from a user experience of a typical person. Finally, "alcohol selection" may be associated with a value of 1.00, for example, to specify that a wide variety of alcohol is available to the establishment and that such a selection adds to an overall user experience.

TABLE B point of interest properties vector for a bar

| Categories | Value |
| --- | --- |
| Nourishment | 0.60 |
| Crowdedness | −0.80 |
| Child-friendly | −1.00 |
| Noise level | −1.00 |
| Alcohol selection | 1.00 |

Table C illustrates a point of interest properties vector for a book store that comprises a point of interest. As shown, Table C includes various categories such as "nourishment," "crowdedness," "child-friendly," "noise level," and "DVD selection." "Nourishment" is associated with a value of 0.10 to indicate that such a book store offers little nourishment. For example, the book store might sell bottles of soda or candy bars, but no other food. "Crowdedness" is associated with a value of 0.30 to indicate, for example, that the bookstore is not very crowded. "Child-friendly" may be associated with a value of 0.75 to indicate that the book store offers products or an experience that children may enjoy. For example, the book store may sell children's book and/or toys. "Noise level" may, for example, be associated with a value of 0.75 to indicate that the noise level is very low within the bookstore. "DVD selection" may be associated with a value of 0.60 to indicate that a reasonable assortment of Digital Versatile Discs (DVDs) are available for sale at such a bookstore.

TABLE C point of interest properties vector for a book store

| Categories | Value |
| --- | --- |
| Nourishment | 0.10 |
| Crowdedness | 0.30 |
| Child-friendly | 0.75 |
| Noise level | 0.75 |
| DVD selection | 0.60 |

If a user requests instructions to a restaurant and Table A is a destination properties vector associated with that destination, a dot product may be calculated between a destination properties vector shown in Table A and point of interest properties vectors shown in Tables B and C to determine whether points of interest associated either of Tables B or C are associated with a high or low measurement of similarity. Table D shown below illustrates values for categories determined by calculating a dot product between a destination represented by Table A and a point of interest represented by Table B. If a dot product is computed, values for categories that are common to both Table A and B are multiplied together and then summed. In this case, the only common categories are "nourishment," "crowdedness," "child-friendly," and "noise level." Table A contains a category "vegan food" and is not common to Table B, so is not multiplied against any other values from Table B, for example.

TABLE D dot product of properties vectors for Tables A and B

| Categories | Value |
| --- | --- |
| Nourishment | 0.60 |
| Crowdedness | 0.48 |
| Child-friendly | −0.75 |
| Noise level | 0.50 |

A value of "nourishment" may be calculated by multiplying a value of 1.00 for Table A with a value of 0.60 for Table B. A product of these values is therefore 0.60 (e.g., 1.00*0.60). Products for "crowdedness," "child-friendly," and "noise level" may similarly be calculated as 0.48, −0.75, and 0.50, respectively. A sum of such products is 0.83 (e.g., 0.60+0.48+−0.75+0.50). A value of 0.83 may indicate that a measurement of similarity between a destination and a point of interest represented by Tables A and B, respectively, is relatively high. Accordingly, a relatively low cost may be associated with a point of interest represented by Table B. In some implementations, a negative cost may be associated with a point of interest represented by Table B as a result of its relatively high measurement of similarity. As discussed above, a lookup table may be referenced to determine a cost associated with a dot product of 0.83.

A dot product may also be calculated based at least in part on a comparison of Tables A and C to determine whether a point of interest associated with Table C is relatively similar to a destination associated with Table A.

TABLE F dot product of properties vectors for Tables A and C

| Categories | Value |
| --- | --- |
| Nourishment | 0.10 |
| Crowdedness | −0.18 |
| Child-friendly | 0.5625 |
| Noise level | −0.375 |

As shown above in Table E, common categories between Tables A and C include "nourishment," "crowdedness," "child-friendly," and "noise level." Products for each common individual category may be determined, as discussed above. Values for products of categories "nourishment," "crowdedness," "child-friendly," and "noise level" may be calculated to be values of 0.10, −0.18, 0.5625, and −0.375. A sum of such products may be determined to comprise a value of 0.1075. A value of 0.1075, or for example, a negative value, may indicate that a measurement of similarity between a destination and a point of interest represented by Tables A and C, respectively, is relatively low. Accordingly, a relatively high cost may be associated with a point of interest represented by Table C via reference to a lookup table, for example.

According to one or more implementations, if a user provides an intended destination to a navigation application, a destination properties vector associated with the destination may be compared with point of interest properties vectors for various points of interest within a certain range or vicinity of the destination. For example, dot products and associated costs may be calculated based on such a comparison. Use of such properties vectors may provide a uniform process for comparing different points of interest with destinations. Such comparisons may be calculated on-the-fly by a navigation application, for example, to determine costs for such points of interest. If costs for such points of interest are known or otherwise calculated, a lowest cost path may be determined between a starting location and a destination.

In one or more implementations, for example, a user may select a group of destinations, as opposed to a single destination. For example, if a user is hungry but does not know the name of a particular fast food place within a mall, user may be directed to an area encompassing multiple fast food places. In one or more implementations, point of interest properties vectors for two or more different points of interest may be combined to determine a composite point of interest properties vector. If, for example, a food court contains both a hamburger stand and a sandwich shop, a composite point of interest properties may be determined that accounts for characteristics of both the hamburger stand and the sandwich shop. In one example, values of categories for a hamburger stand and a sandwich shop may be averaged together to determine values for categories in a composite point of interest properties vector. For example, if point of interest properties vector for a hamburger stand has a value of "0.85" for "nourishment," and a sandwich shop has a value of "0.55" for the same category, a value for "nourishment" in a composite point of interest properties vector may be "0.70," e.g., an average of values "0.85" and "0.55." In some implementations, on the other hand, values for a particular category may be added together instead of averaged.

Figure 5:
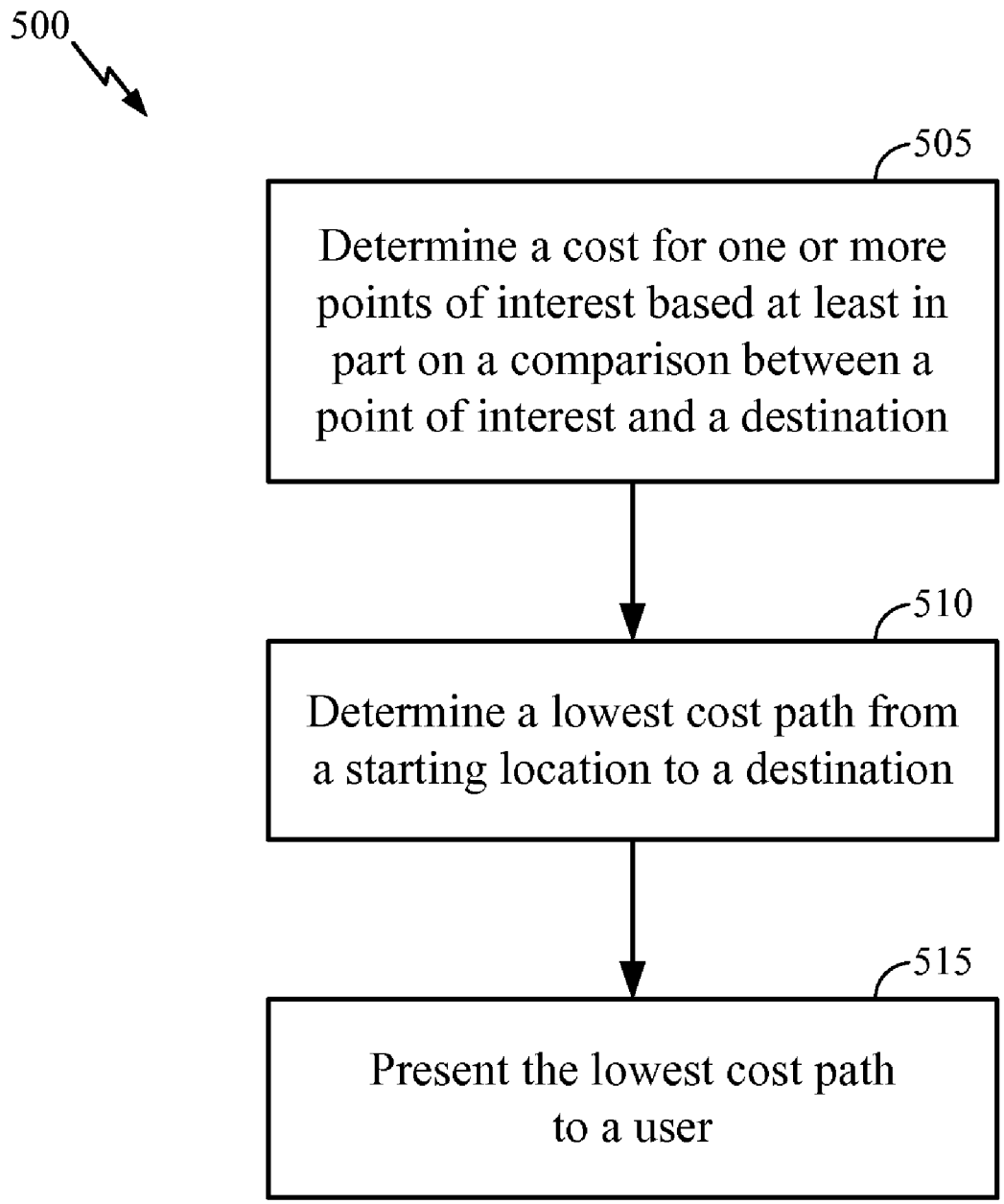
FIG. 5 is a flow diagram of a process for determining a low cost path from a starting location to a destination according to one or more implementations.

FIG. 5 is a flow diagram 500 of a process for determining a low cost path from a starting location to a destination according to one or more implementations. First, at operation 505, a cost may be determined for one or more points of interest based at least in part on a comparison between a point of interest and a destination. As discussed above, a user may provide an intended destination via a user input. Based on an intended destination, relative costs for one or more points of interest may be determined. For example, a dot product may be utilized to determined respective values of points of interest based on a comparison with a destination. Associated costs may be determined based at least in part on such a measurement of similarity between points of interest and a destination. Costs for point of interest nodes may be projected onto corridor nodes and may be utilized to determine a lowest cost path from a starting location to a destination at operation 510. For example, a lowest cost path from a starting location to a destination may be determined based at least in part on costs associated with one or more points of interest along the path. Finally, at operation 515, a lowest cost path may be presented to a user. For example, navigation instructions may be displayed or audibly presented to a user.

Figure 6:
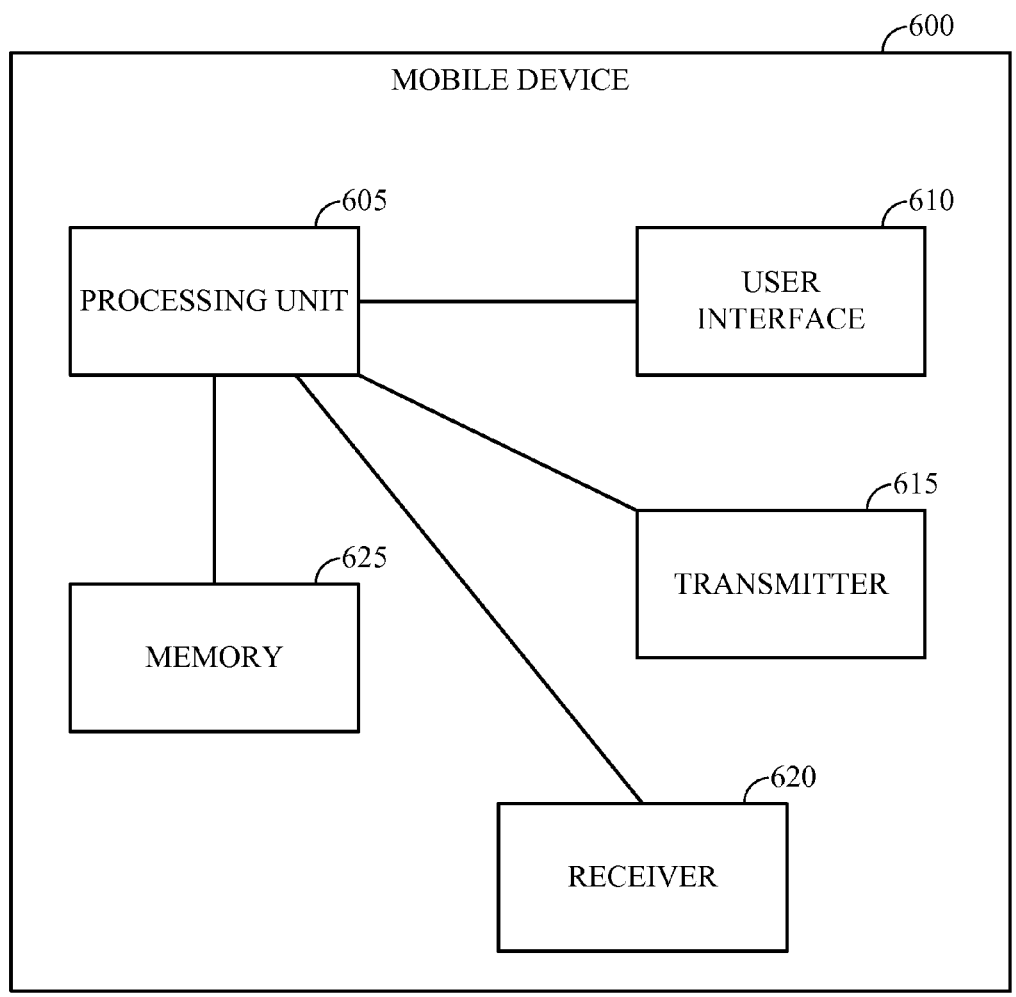
FIG. 6 is a schematic block diagram of a particular implementation of a mobile device according to one or more implementations.

FIG. 6 is a schematic block diagram of a particular implementation of a mobile device 600 according to one implementation. Mobile device 600 may include several elements such as processing unit 605, user interface 610, transmitter 615, receiver 620, and memory 625. Mobile device 600 may determine a lowest cost path from a starting location to a destination. A map may be transmitted from a map server to mobile device 600 via a network, such as the Internet, for example. In some implementations, a map may be pre-stored in a memory 625. Names and locations of various points of interest may be associated with a map and stored with associated properties vectors in memory 625. If a destination is received via a user input, for example, a processing unit 605 may compute dot products between a destination properties vector and various point of interest properties vectors and may determine associated costs for such points of interest. In some implementations, such dot products and associated costs for points of interest may be determined remotely at a map server, for example, and may be transmitted to mobile device 600.

Mobile device 600 may comprise a mobile station (MS) in which a radio transmitter may be adapted to modulate an RF carrier signal with baseband information, such as voice or data, onto an RF carrier, and a radio receiver may demodulate a modulated RF carrier to obtain such baseband information.

User interface 610 may comprise a plurality of devices for inputting or outputting user information such as voice or data. Such devices may include, for example, a keyboard, a display screen, a microphone, a speaker, buttons and knobs, just to name a few examples. User interface 610 may present a map to a user. Memory 625 may be adapted to store machine-readable instructions, which are executable to perform one or more of processes, examples, or implementations thereof which have been described or suggested. Processing unit 605 may be adapted to access and execute such machine-readable instructions. Through execution of these machine-readable instructions, processing unit 605 may direct various elements of mobile device 600 to perform one or more functions.

Transmitter 615 may utilize an antenna to transmit communications, such as packet-based communications to other wireless devices. Receiver 620 may also utilize such an antenna to receive communications, such as packet-based communications from other wireless devices.

As discussed above, a mobile device may estimate its own location by communicating with one or more nearby femtocells in some implementations. A femtocell may, for example, utilize a technology such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA), to name just a few among many possible technologies compatible with femtocells. A femtocell may also have integrated Wi-Fi, in which case round-trip time ranging may be performed utilizing the femtocell.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the above discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processing units programmed with instructions to perform one or more specific functions.

Techniques discussed herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As used herein, a mobile station (MS) refers to a device such as a cellular or other wireless communication device, personal communication system (PCS) device, personal navigation device (PND), Personal Information Manager (PIM), Personal Digital Assistant (PDA), laptop, tablet or other suitable device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable media include physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   receiving, in a processor, user input comprising identities of one or more destinations;
   determining, in the processor, an optimal path from an estimated location of a mobile device to the one or more destinations based at least in part on a measurement of similarity between one or more points of interest along the optimal path and the one or more destinations; and
   presenting the optimal path to a user.

2. The method of claim 1, wherein the optimal path comprises a lowest cost path.

3. The method of claim 1, further comprising determining the one or more destinations based at least in part on a user input indicating a category of destinations.

4. The method of claim 1, further comprising determining the measurement of similarity based at least in part on predefined criteria characterizing the one or more destinations and one or more points of interest.

5. The method of claim 4, wherein a destination properties vector is associated with at least one destination of the one or more destinations and one or more points of interest properties vectors are associated with the one or more points of interest.

6. The method of claim 5, wherein the predefined criteria comprises one or more dot products between the destination properties vector and the one or more points of interest properties vectors.

7. The method of claim 5, wherein the destination properties vector and the one or more points of interest properties vectors comprise weights for predefined characteristics.

8. The method of claim 1, wherein the method is adapted to determine the optimal path within a pedestrian navigation environment.

9. The method of claim 1, wherein a cost for a point of interest is projected onto one or more nodes along the optimal path.

10. The method of claim 9, wherein the cost for the point of interest is projected onto at least two nodes along the optimal path based at least in part on physical dimensions of the point of interest.

11. The method of claim 1, wherein the presenting the optimal path comprises presenting one or more navigation instructions.

12. An apparatus, comprising:
    a user input device adapted to receive a user input comprising identities of one or more destinations;
    a processing unit adapted to determine an optimal path from an estimated location of a mobile device to the one or more destinations based at least in part on a measurement of similarity between one or more points of interest along the optimal path and the one or more destinations; and
    an output device to present the optimal path to a user.

13. The apparatus of claim 12, wherein the optimal path comprises a lowest cost path.

14. The apparatus of claim 12, wherein the processing unit is adapted to determine the one or more destinations based at least in part on a user input indicating a category of destinations.

15. The apparatus of claim 12, wherein the processing unit is adapted to determine the measurement of similarity based at least in part on predefined criteria characterizing the one or more destinations and one or more points of interest.

16. The apparatus of claim 15, wherein a destination properties vector is associated with at least one destination of the one or more destinations and one or more points of interest properties vectors are associated with the one or more points of interest.

17. The apparatus of claim 16, wherein the predefined criteria comprises one or more dot products between the destination properties vector and the one or more points of interest properties vectors.

18. The apparatus of claim 16, wherein the destination properties vector and the one or more points of interest properties vectors comprise weights for predefined characteristics.

19. The apparatus of claim 12, wherein the processing unit is adapted to determine the optimal path within a pedestrian navigation environment.

20. The apparatus of claim 12, wherein the processing unit is adapted to project a cost for a point of interest onto one or more nodes along the optimal path.

21. The apparatus of claim 20, wherein the cost for the point of interest is projected onto at least two nodes along the optimal path based at least in part on physical dimensions of the point of interest.

22. The apparatus of claim 12, wherein the output device comprises a display device.

23. The apparatus of claim 12, wherein the output device comprises a speaker.

24. An apparatus, comprising:
    means for receiving a user input comprising identities of one or more destinations;
    means for determining an optimal path from an estimated location of a mobile device to the one or more destinations based at least in part on a measurement of similarity between one or more points of interest along the optimal path and the one or more destinations; and
    means for presenting the optimal path to a user.

25. The apparatus of claim 24, wherein the optimal path comprises a lowest cost path.

26. The apparatus of claim 24, further comprising means for determining the one or more destinations based at least in part on a user input indicating a category of destinations.

27. The apparatus of claim 24, further comprising means for determining the measurement of similarity based at least in part on predefined criteria characterizing the one or more destinations and one or more points of interest.

28. The apparatus of claim 27, wherein a destination properties vector is associated with at least one destination of the one or more destinations and one or more points of interest properties vectors are associated with the one or more points of interest.

29. The apparatus of claim 28, wherein the predefined criteria comprises one or more dot products between the destination properties vector and the one or more points of interest properties vectors.

30. The apparatus of claim 28, wherein the destination properties vector and the one or more points of interest properties vectors comprise weights for predefined characteristics.

31. The apparatus of claim 24, further comprising means for determining the optimal path within a pedestrian navigation environment.

32. The apparatus of claim 24, further comprising means for projecting a cost for a point of interest onto one or more nodes along the optimal path.

33. The apparatus of claim 32, wherein the means for projecting is adapted to project the cost for the point of interest onto at least two nodes along the optimal path based at least in part on physical dimensions of the point of interest.

34. An article, comprising:
a non-transitory computer-readable medium comprising instructions executable by a special purpose apparatus, the instructions comprising:
code to receive a user input comprising identities of one or more destinations;
code to determine an optimal path from an estimated location of a mobile device to the one or more destinations based at least in part on a measurement of similarity based at least in part on a measurement of similarity between one or more points of interest along the optimal path and the one or more destinations; and
code to generate one or more signals to present the optimal path to a user.

35. The article of claim 34, wherein the optimal path comprises a lowest cost path.

36. The article of claim 34, wherein the instructions further comprise code to determine the one or more destinations based at least in part on a user input indicating a category of destinations.

37. The article of claim 34, wherein the instructions further comprise code to determine the measurement of similarity based at least in part on predefined criteria characterizing the one or more destinations and one or more points of interest.

38. The article of claim 37, wherein a destination properties vector is associated with at least one destination of the one or more destinations and one or more points of interest properties vectors are associated with the one or more points of interest.

39. The article of claim 38, wherein the predefined criteria comprises one or more dot products between the destination properties vector and the one or more points of interest properties vectors.

40. The article of claim 38, wherein the destination properties vector and the one or more points of interest properties vectors comprise weights for predefined characteristics.

41. The article of claim 34, wherein the instructions further comprise code to determine the optimal path within a pedestrian navigation environment.

42. The article of claim 34, wherein the instructions further comprise code to project a cost for a point of interest onto one or more nodes along the optimal path.

43. The article of claim 42, wherein the instructions further comprise code to project the cost for the point of interest onto at least two nodes along the optimal path based at least in part on physical dimensions of the point of interest.

44. The article of claim 34, wherein the one or more signals comprise one or more display signals to present the optimal path via a display device.

* * * * *